(No Model.) 6 Sheets—Sheet 1.

S. SEABURY.
MEANS FOR PROPELLING VESSELS.

No. 472,199. Patented Apr. 5, 1892.

Witnesses:
O. E. Sundgren
D. H. Hayward

Inventor:
Samuel Seabury
by attorneys (No Model.)  
6 Sheets—Sheet 2.

S. SEABURY.
MEANS FOR PROPELLING VESSELS.

No. 472,199.  Patented Apr. 5, 1892.

Witnesses:  
C. E. Sundgren  
D. H. Hayford

Inventor:  
Samuel Seabury  
by attorneys  
Brown & Seward (No Model.) 6 Sheets—Sheet 3.

S. SEABURY.
MEANS FOR PROPELLING VESSELS.

No. 472,199. Patented Apr. 5, 1892.

Witnesses:
C. Sundgren
D. H. Hayward

Inventor:
Samuel Seabury
by attorneys
Brown & Seward (No Model.) 6 Sheets—Sheet 4.

S. SEABURY.
MEANS FOR PROPELLING VESSELS.

No. 472,199. Patented Apr. 5, 1892.

Witnesses:
C. E. Lundgren
D. H. Haywood

Inventor:
Samuel Seabury
by attorneys
Brown & Seward (No Model.) 6 Sheets—Sheet 5.

S. SEABURY.
MEANS FOR PROPELLING VESSELS.

No. 472,199. Patented Apr. 5, 1892.

Witnesses:
C. Sundgren
D. H. Haynes

Inventor:
Samuel Seabury
by attorneys
Brown & Seward (No Model.) 6 Sheets—Sheet 6.

S. SEABURY.
MEANS FOR PROPELLING VESSELS.

No. 472,199. Patented Apr. 5, 1892.

Figure 15:
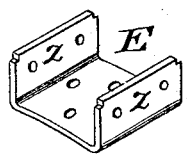
Figure 15:
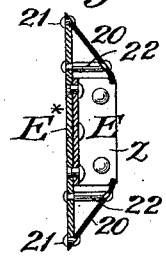

*Fig. 15\**

Witnesses:
C. F. Sundgren
D. H. Haywood

Inventor:
Samuel Seabury
by attorneys
Brown & Seward

THE NORRIS PETERS CO., PHOTO-LITHO., WASHINGTON, D. C.

UNITED STATES PATENT OFFICE.

SAMUEL SEABURY, OF THE UNITED STATES NAVY.

MEANS FOR PROPELLING VESSELS.

SPECIFICATION forming part of Letters Patent No. 472,199, dated April 5, 1892.

Application filed July 7, 1891. Serial No. 398,689. (No model.)

*To all whom it may concern:*

Be it known that I, SAMUEL SEABURY, lieutenant in United States Navy, at present residing at Bergen Point, in the county of Hudson and State of New Jersey, have invented a new and useful Improvement in Means for Propelling Vessels, of which the following is a specification, reference being had to the accompanying drawings.

A propelling apparatus embodying my invention consists of a screw-propeller having affixed to it a bucket-wheel against which water is forced beneath the load water-line of the vessel to be propelled by a pump on board of the said vessel for the purpose of driving the propeller.

My invention is applicable in combination with a single propeller or with twin propellers, and may be so applied that the propeller or propellers may be operated as a rudder for the purpose of steering the vessel.

Figure 1:
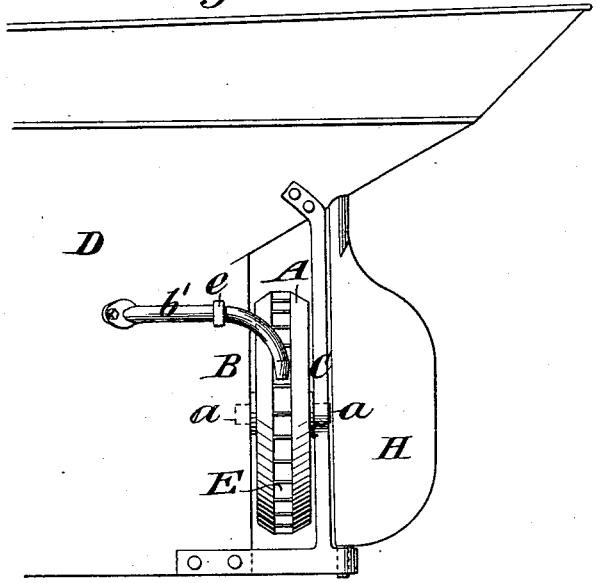
Figure 2:
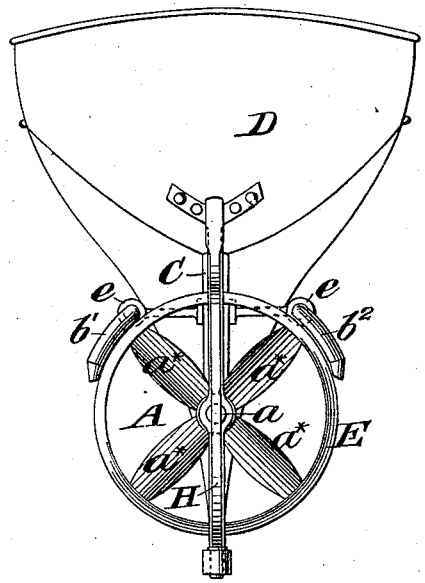
Figure 3:
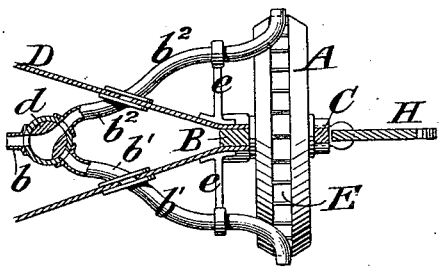
Figure 4:
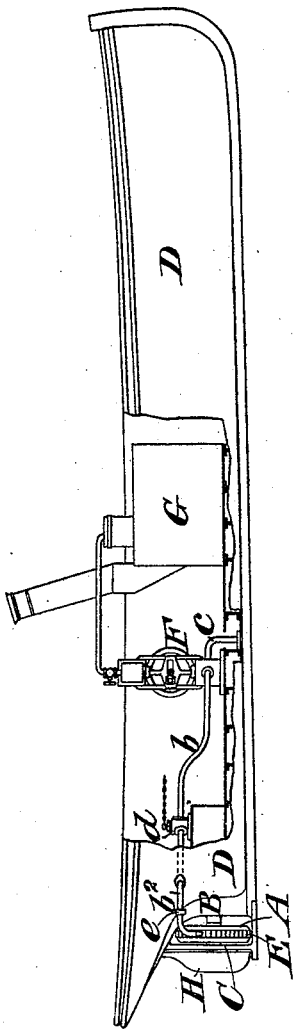
Figure 5:
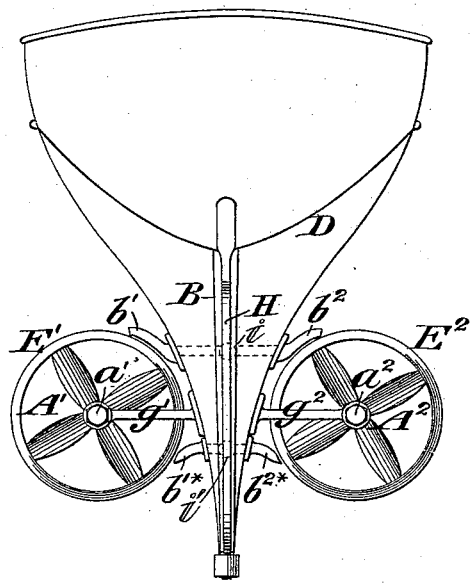
Figure 6:
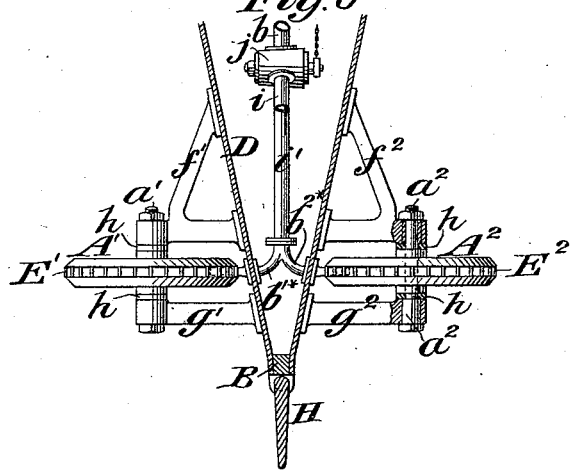
Figure 7:
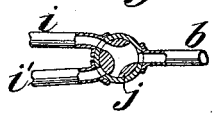
Figure 8:
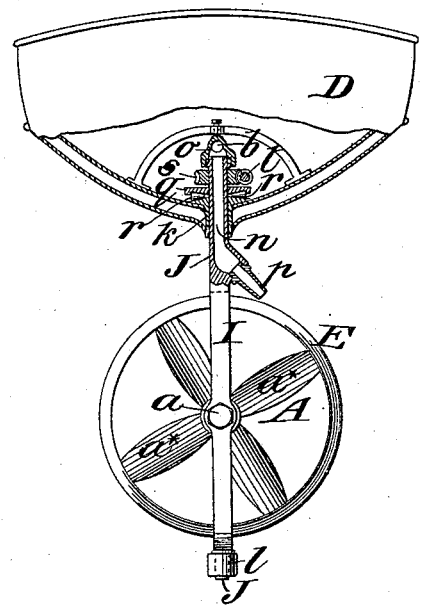
Figure 9:
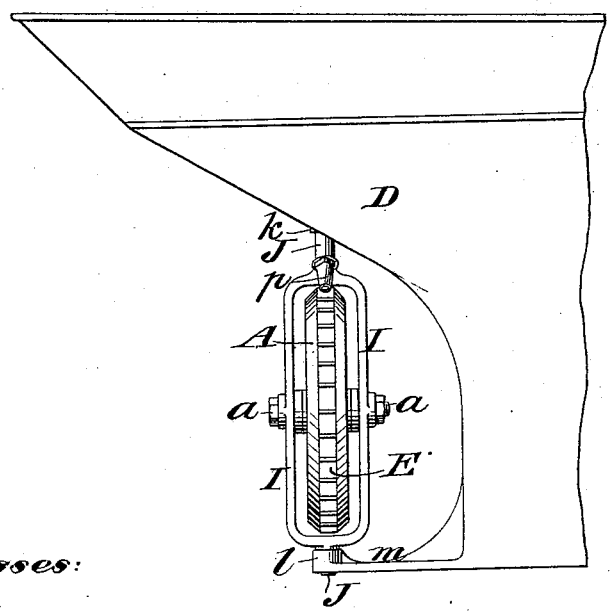
Figure 10:
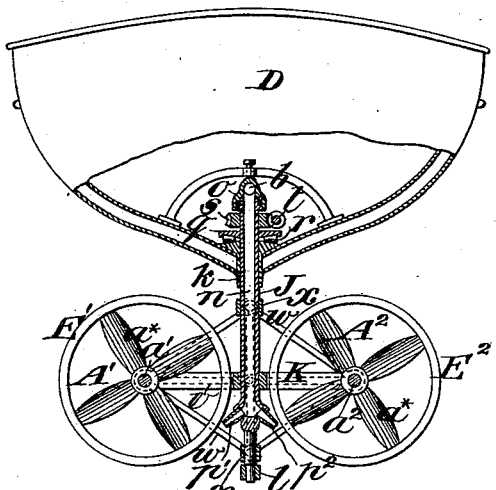
Figure 12:
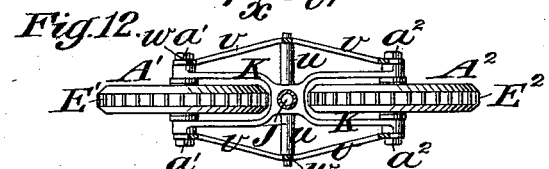
Figure 11:
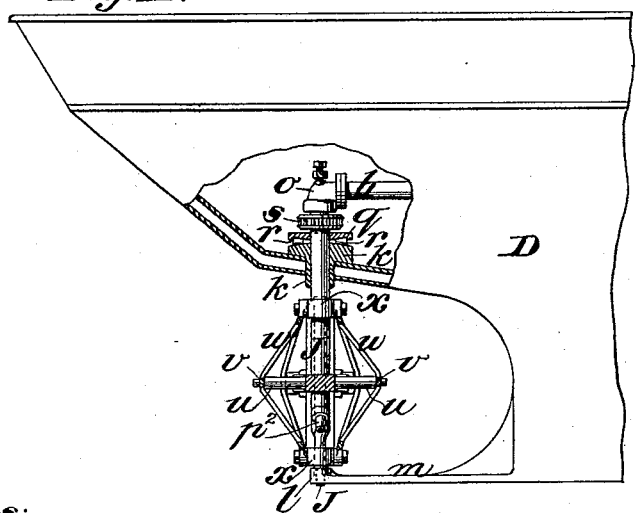
Figure 13:
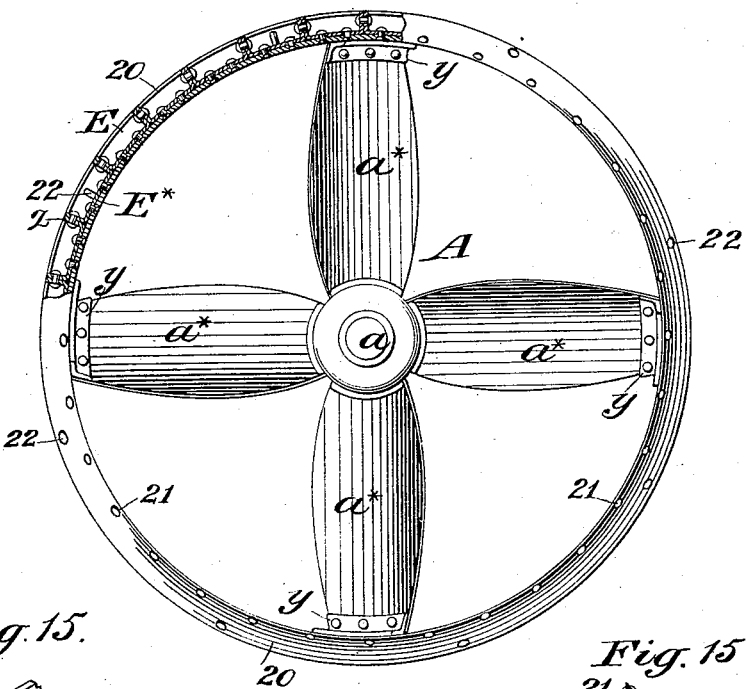
Figure 14:
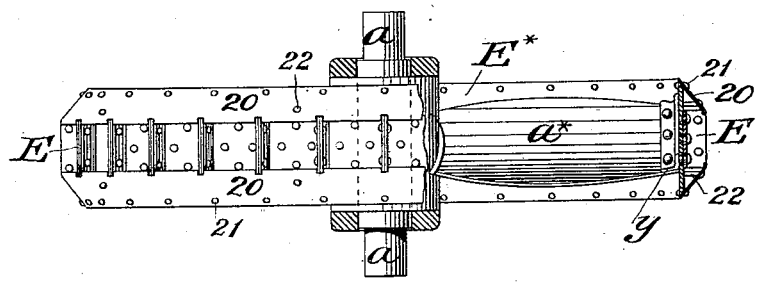
Figure 16:

Figure 1 is a side view of the after portion of a vessel, illustrating the application of my invention in connection with a single screw-propeller. Fig. 2 is a stern view corresponding with Fig. 1. Fig. 3 is a horizontal sectional view corresponding with Figs. 1 and 2, taken a short distance above the propeller. Fig. 4 is a side view of a vessel, partly in section, showing the propelling apparatus like that shown in Figs. 1, 2, and 3 and the motor for driving the same. Fig. 5 is a stern view of a vessel with twin propellers having my invention applied. Fig. 6 is a horizontal sectional view corresponding with Fig. 5, taken just above the propellers. Fig. 7 is a vertical sectional view of some of the details of Fig. 6. Fig. 8 is a stern view, partly in section, illustrating one form of my invention in which a single propeller is employed both for propelling and steering. Fig. 9 is a side view of the after portion of the vessel, corresponding with Fig. 8. Fig. 10 is a stern view, partly in section, illustrating twin propellers applied according to my invention for both propelling and steering. Fig. 11 represents a side view, partly in section, of the after portion of a vessel corresponding with Fig. 10. Fig. 12 is a plan view of the propelling and steering apparatus corresponding with Figs. 10 and 11. Fig. 13 is a rear view, on a larger scale than the preceding figures, of a combined screw-propeller and attached bucket-wheel, the bucket-wheel being also partly in section. Fig. 14 is a plan view corresponding with Fig. 13, showing the bucket-wheel partly in section. Fig. 15 is a perspective view of one of a series of channel-irons of which the buckets of the said wheel are constructed. Fig. 15* is a section of the rim and attached members of the bucket-wheel on a larger scale than Figs. 13 and 14. Fig. 16 is a sectional view of part of the bucket-wheel, illustrating a modification of the invention.

Similar letters and numerals of reference designate corresponding parts in all the figures.

In the example of my invention represented in Figs. 1, 2, 3 and 4 the screw-propeller A, which may have its hub and blades like those of propellers in common use, is represented as arranged between the main stern-post B and the after stern-post C of the vessel D in the usual way, and its shaft $a$ is supported in bearings in the said posts. As it is not necessary for the shaft $a$ to enter the vessel, it may, as shown in Fig. 1, terminate in the main stern-post B, in which may be provided for it the ordinary thrust-bearing.

The bucket-wheel, which constitutes one of the principal features of my invention and which may be affixed in any suitable manner to the shaft of the propeller, is represented as consisting of an annular series of buckets E E, encircling the propeller-blades $a^*$, which are thus made to constitute the arms or spokes of the bucket-wheel. These buckets may be substantially like those of an ordinary water-wheel such as is used as a water-power motor, the construction of the said buckets being such as to provide for the said wheel, and the propeller being driven in one or other direction by water directed upon and forced against the said buckets below the load water-line of the vessel through one or other of two pipes $b'$ $b^2$, which protrude from the interior of the vessel to the outside thereof, one on each side of the stern-post B, and the ends of which turn outward in opposite directions, one toward one side and the other toward the other side of the bucket-wheel, so as to deliver water in opposite directions against said wheel. These pipes $b'$ $b^2$ are represented as branching from the discharge-pipe $b$ of a force-pump F on board the vessel. The said pipes are represented as supported outside of the vessel by brackets $e$, secured to the exterior of the stern thereof. The said pump may be of any suitable kind and may be driven by any suitable motor, but is represented as a steam-pump receiving steam from a boiler G on board the vessel and as having its suction-pipe $c$ opening through the bottom of the vessel. At the junction of the two branch-pipes $b'$ $b^2$ with the main discharge-pipe $b$ of the pump there is a three-way valve $d$ by which to direct water from the said pipe $b$ into either of the said branch pipes $b'$ $b^2$ and shut it off from the other of said branch pipes, according to the direction in which the bucket-wheel and the propeller are to be driven, for the purpose of propelling the vessel forward or the reverse.

When the pump is in operation, water is drawn into it through the suction-pipe $c$ and expelled through the main delivery-pipe $b$ and one of the branch pipes and the water so delivered acts against the buckets of the wheel E with a force in proportion to the pressure imparted to it by the pump, and is so caused to turn the propeller to produce the propulsion. In this example of my invention the steering of the vessel may be performed by an ordinary rudder H, applied in the manner common to vessels with single screw-propellers outside the after stern-post C.

In the example of my invention represented in Figs. 5 and 6, in which twin-screw propellers $A'$ $A^2$, one having a right-hand and the other having a left-hand pitch, are used, the shafts $a'$ $a^2$ of the said propellers, like the shaft $a$ in the first-described example, do not enter the vessel; but they are supported one on each side of the after portion or stern of the vessel in brackets $f'$ $f^2$ and $g'$ $g^2$, secured to the hull of the vessel. These shafts are represented as fixed and as having the propellers turning freely upon them, and thrust-bearings $h$ $h$ are represented as applied around the said shaft between the hubs and the said brackets. The twin propellers $A'$ $A^2$ are respectively constructed or provided with encircling bucket-wheels $E'$ $E^2$, like the bucket-wheel E in the first-described example, to be driven by water issuing from pipes $b'$ $b^2$ $b'^*$ $b^{2*}$, protruding through the sides of the stern or after portion of the vessel and supplied by a pumping apparatus on board the vessel. These several pipes may be all supplied by one common discharge-pipe $b$ from the pumping apparatus. The portions of the pipes $b'$ $b^2$, which are outside of the vessel are directed toward the upper portions of their respective bucket-wheels, and the protruding portions of the pipes $b'^*$ $b^{2*}$ are directed against the lower portions of the wheels, so that water issuing through the pipes $b'$ $b^2$ will drive their respective bucket-wheels and screw-propellers in one direction and water issuing from the lower pipes $b'^*$ $b^{2*}$ will drive their respective bucket-wheels and screw-propellers in the opposite direction, so that it is only necessary to open the communication between the main discharge-pipe $b$ of the pumping apparatus to the upper pipes $b'$ $b^2$ and close the communication between the said pipe $b$ and the lower discharge-pipes $b'^*$ $b^{2*}$ to drive the vessel in one direction or to reverse the communications for driving the vessel in the opposite direction. This change of communication may be effected by making two branches $i$ $i'$, one above the other, from the pipe $b$ and branching off the pipes $b'$ $b^2$ from the upper branch $i$ and the pipes $b'^*$ $b^{2*}$ from the lower branch $i'$ and applying a three-way valve $j$ at the branching of the pipes $i$ $i'$ from the main discharge-pipe $b$, as may be understood by reference to Figs. 6 and 7, the latter figure representing a vertical section of the said valve and the connections of the pipes $b$ $i$ $i'$. In this example the rudder H is represented as hung in rear of the stern-post B in the usual way, there being no second stern-post.

In the example of my invention shown in Figs. 8 and 9 there is a single screw-propeller A, provided with a bucket-wheel E; but the shaft $a$ of the said propeller and wheel, instead of being arranged in fixed bearings, is arranged in a frame I, having an upright shaft J, which is arranged to turn in an upper bearing $k$ in the hull of the vessel, and the lower bearing $l$ in the prolonged heel $m$ thereof. The upper part of the said shaft J is hollow, as shown at $n$ in Fig. 8, to form a water-conduit, and its upper end is connected with the discharge-pipe $b$ of the pumping apparatus on board the vessel by a connection $o$ of any suitable kind which makes a water-tight joint, but permits the turning of the said shaft. From the hollow portion $n$ of the said shaft J there projects a nozzle $p$, which is directed toward the buckets of the bucket-wheel E in such manner as to deliver water thereon for the purpose of producing the rotation of said bucket-wheel and screw-propeller for propelling the vessel.

By turning the frame I in substantially the same way in which an ordinary rudder is turned the angle between the screw-propeller and the attached bucket-wheel and the center line of the vessel is so changed as to make the propeller serve the purpose of directing as well as propelling the vessel. By producing a half-revolution of the shaft J and frame I the action of the propeller upon the vessel is reversed.

In the example of my invention shown in Figs. 10, 11, and 12 twin propellers $A'$ $A^2$, fitted with encircling bucket-wheels $E'$ $E^2$, are represented as hung in a frame K, carried by an upright shaft J, which is arranged to turn in bearings $k$ $l$, substantially like those described with reference to Figs. 8 and 9. The said frame is represented as consisting of a horizontal yoke K, fast upon the said shaft, bifurcated at both ends (see Fig. 12) to form the bearings for the propeller-shafts $a'$ $a^2$ and to receive the propellers $A'$ $A^2$ and their attached bucket-wheels E' E², and as having horizontal struts $u$ projecting from it, and is further represented as braced to the shaft, both horizontally and vertically by braces $v$, connecting the ends of the yoke with said struts $u$, and braces $w$, connecting said struts and the ends of the yoke with collars $x$ on said shaft. The upper portion of the shaft J, and in fact the greater portion of its length from the upper end outward, is represented hollow like the upper portion of the shaft J in Figs. 8 and 9 to form a water-conduit and connected in the same way with the discharge-pipe $b$ of the pumping apparatus by a water-tight joint, which permits the turning of the said shaft and its attached frame and the propellers and their attached bucket-wheels. From the hollow portion $n$ of the said shaft there project in opposite directions two nozzles $p'$ $p^2$, one of which is directed toward the buckets of the bucket-wheel E' and the other of which is directed toward the buckets of the bucket-wheel E², so as to deliver water on the said buckets to produce the rotation of the propellers in opposite directions. The two propellers, being of opposite pitch and their rotation being always in opposite directions, both have their propulsive effect in the same direction. By turning the shaft J and the frame K the propellers are made to serve the purpose of directing as well as propelling the vessel. By bringing the propeller-shafts at right angles to the center line of the vessel the vessel may be caused to swing upon a circle of which the bow is the center, or by turning the shaft half-way round to reverse the position of the propellers the action of the propellers upon the vessel is reversed.

Both in the example of my invention represented in Figs. 8 and 9 and in Figs. 10, 11, 12 the shaft J is represented as supported above the bearing $k$ by means of a collar $q$, fast on the said shaft and which runs on anti-friction rollers $r$ on the top of the said bearing. The means represented in Figs. 8, 9, 10, and 11 for turning the shaft J and its frame and the propellers and their bucket-wheels is a worm-gear $s$ on the said shaft and an endless screw $t$, which is engaged with said worm-gear for the purpose of turning the said shaft in the same way in which the post of an ordinary rudder is turned for the purpose of steering a vessel.

It is obvious that as the shafts of the screw-propellers in the two examples shown in Figs. 8 and 9 and in Figs. 10, 11, and 12 are entirely outside of the vessel it is immaterial whether the shafts $a$ $a'$ $a^2$ turn in bearings in their supporting-frames and have the propellers and bucket-wheels fast upon them or the said shafts are fast within the frames and the screw-propellers and attached bucket-wheels are loose upon the said shafts.

While my invention is not limited to any particular construction of the bucket-wheel or any particular method of combining the said wheel with the propeller and its shaft, I have thought proper to illustrate in Figs. 13, 14, 15, and 15* the construction of said bucket-wheel and the combination thereof with the propeller which I at present prefer to adopt, and I will now proceed to describe that construction and combination.

E* designates a broad cylindrical band or rim encircling the blades $a$* of the propeller and secured thereto by angle-irons $y$, riveted to the said band or rim E* and to the ends of the propeller-blades. Upon this band or rim are constructed the buckets E, which are represented as formed of channel-irons, such as are shown in Fig. 15, arranged close together all around the said band or rim and riveted thereto, the cheeks $z$ of the adjacent channel-irons being riveted together, so that the two cheeks constitute a bucket. The band or rim E* is made, as shown in Figs. 14 and 15*, considerably wider than the buckets, so that it extends beyond them both forward and aft. Outside of the buckets on either side is a supplemental rim 20 of conical form, which incloses the spaces between the buckets at the ends thereof and unites with the edges of the rim in an acute angle. These supplemental rims 20 are secured to the rim E* of the bucket-wheel by rivets 21 22, as shown in Fig. 15*, and the said supplemental rims are notched, as shown at the left in Fig. 14, to receive the edges of the buckets, so that the buckets and the said rims are mutually self-sustaining. These supplemental rims inclosing the sides of the buckets and uniting with the rim at an acute angle cause the bucket-wheel to present a comparatively sharp edge to the water in the movements of the bucket-wheel with the vessel, and therefore the drag of the bucket-wheel upon the vessel is very much reduced as compared with what it would be if the front and back of the said wheel were parallel with the planes of their revolution.

In the bucket-wheel illustrated by Fig. 16 several buckets E are formed of one strip or band of metal having corrugations of zigzag form in their transverse section, and the said strip is lapped around and riveted to the band E*. This form is only suitable in cases in which the screw-propeller is only required to turn in one direction—for instance, in the example of my invention represented in Figs. 8, 9, 10, 11, and 12.

By the term "force-pump" as employed in this specification I mean to include any apparatus capable of forcing water under pressure through pipes or nozzles by which the water is to be directed against the bucket-wheels.

What I claim as my invention, and desire to secure by Letters Patent, is—

1. The combination, in a navigable vessel, of a screw-propeller, a shaft therefor and bucket-wheel affixed thereto, a force-pump, and a jet-pipe for delivering water from the pump to the buckets of said wheel below the load water-line of the vessel, substantially as herein set forth.

2. The combination, in a navigable vessel, of a screw-propeller, a shaft therefor and a bucket-wheel affixed thereto, a force-pump, two delivery-pipes for delivering water in opposite directions to the buckets of said wheel below the load water-line of the vessel, and a valve for directing water from the pump to one or other of said pipes, substantially as herein set forth.

3. The combination, in a navigable vessel, of a screw-propeller, a shaft therefor and a bucket-wheel affixed thereto, a frame containing the bearings for said shaft, a substantially vertical shaft for said frame, a portion of which shaft is hollow, a force-pump and a jet-pipe connected with said pump and said shaft for delivering water from said pump to said bucket-wheel through the hollow portion of said shaft, and means of turning said shaft, frame, and propeller, substantially as and for the purpose herein set forth.

4. The combination, in a navigable vessel, of two screw-propellers of opposite pitch and shafts therefor and bucket-wheels affixed thereto, a frame and a substantially vertical shaft therefor, a part of which shaft is hollow to constitute a water-conduit, the said frame containing bearings on the opposite sides of said shaft for the two propeller-shafts, and the water-conduit in said shaft having opposite outlets toward said bucket-wheels, a force-pump, a pipe connecting said pump with the water-conduit in said shaft, and means of turning said shaft on its axis, all substantially as and for the purpose herein set forth.

5. The combination, in a navigable vessel, of a screw-propeller, a rim surrounding and secured to the blades of said propeller, a series of buckets on the exterior of said rim, supplemental rims inclosing the sides of said buckets and uniting with the edges of the first-mentioned rim in acute angles, a force-pump on board of said vessel, and a jet-pipe for delivering water from said pump to said buckets below the load water-line of the vessel, substantially as herein described.

SAMUEL SEABURY.

Witnesses:
FREDK. HAYNES,
D. H. HAYWOOD.